US012215521B2

(12) United States Patent
Eden et al.

(10) Patent No.: US 12,215,521 B2
(45) **Date of Patent: *Feb. 4, 2025**

(54) ANTI-THEFT MERCHANDISE HOOK

(71) Applicant: Fasteners for Retail, Inc., Twinsburg, OH (US)

(72) Inventors: Keith C. Eden, Loves Park, IL (US); Shane Obitts, North Ridgeville, OH (US); Brent O. Ewing, Roscoe, IL (US); Chan Chor Man, Tai Po N.T. (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,032

(22) Filed: Apr. 21, 2023

(65) Prior Publication Data

US 2023/0250675 A1 Aug. 10, 2023

Related U.S. Application Data

(63) Continuation of application No. 17/545,469, filed on Dec. 8, 2021, now Pat. No. 11,680,427.

(Continued)

(51) Int. Cl.

*A47F 5/08* (2006.01)
*A47F 1/12* (2006.01)

(Continued)

(52) U.S. Cl.

CPC .............. *E05B 45/08* (2013.01); *A47F 1/128* (2013.01); *A47F 5/0006* (2013.01);

(Continued)

(58) Field of Classification Search

CPC ...... A47F 5/0006; A47F 1/128; A47F 5/0861; A47F 5/0823; A47F 5/0869; A47F 7/143;

(Continued)

(56) References Cited

U.S. PATENT DOCUMENTS 3,785,501 A 1/1974 Canning
4,289,242 A 9/1981 Kenyon (Continued)

FOREIGN PATENT DOCUMENTS

KR 101210320 B1 12/2012
WO 2015/020754 A1 2/2015

(Continued)

*Primary Examiner* — Jennifer E. Novosad

(74) *Attorney, Agent, or Firm* — Reinhart Boerner Van Deuren P.C.

(57) ABSTRACT

An anti-theft merchandise hook that includes a top wire connected to a housing portion at a first end of the top wire, and to a mounting portion, used to mount the anti-theft merchandise hook to a stationary surface, at a second end of the top wire opposite the first end. A bottom wire is attached to the mounting portion and extends from the mounting portion toward the housing portion. The bottom wire is configured to hold retail merchandise. A moveable hanger is at least partially disposed within the housing portion. The hanger is configured to move linearly between a closed position in which the hanger abuts the bottom wire, and an open position in which the hanger is spaced some distance from the bottom wire.

10 Claims, 7 Drawing Sheets

Related U.S. Application Data

(60) Provisional application No. 63/123,299, filed on Dec. 9, 2020.

(51) Int. Cl.

*A47F 5/00* (2006.01)
*E05B 45/08* (2006.01)
*E05B 73/00* (2006.01)
*G08B 13/14* (2006.01)
*E05B 45/06* (2006.01)
*E05B 47/00* (2006.01)

(52) U.S. Cl.

CPC .......... *A47F 5/0823* (2013.01); *A47F 5/0861* (2013.01); *A47F 5/0869* (2013.01); *E05B 73/00* (2013.01); *G08B 13/14* (2013.01); *E05B 2045/065* (2013.01); *E05B 47/0012* (2013.01); *E05B 2047/0017* (2013.01)

(58) Field of Classification Search

CPC ........ E05B 73/00; E05B 69/006; E05B 45/06; E05B 73/0017; E05B 45/08; E05B 47/0012; E05B 2045/065; E05B 2047/0017; G08B 13/149; G08B 13/14

USPC ...................... 211/7, 57.1, 59.1; 70/57.1, 62; 340/568.1

See application file for complete search history.

(56) References Cited

U.S. PATENT DOCUMENTS

| | | | | |
|---|---|---|---|---|
| 4,394,909 | A | 7/1983 | Valiulis et al. | |
| 4,462,497 | A | 7/1984 | Maule | |
| 4,474,300 | A | 10/1984 | Entis | |
| 5,144,820 | A | 9/1992 | Holmgren | |
| 5,971,593 | A | 10/1999 | McGrady | |
| 6,439,423 | B1 | 8/2002 | Suzuki | |
| 6,474,478 | B1 | 11/2002 | Huehner et al. | |
| 6,659,291 | B2 * | 12/2003 | Huehner | A47F 5/0861 211/4 |
| 6,957,555 | B1 | 10/2005 | Nagel et al. | |
| 7,197,902 | B1 | 4/2007 | Barkdoll | |
| 7,269,983 | B1 | 9/2007 | Mchatet | |
| 7,533,784 | B2 | 5/2009 | Vlastakis et al. | |
| 7,559,437 | B2 | 7/2009 | Colelli et al. | |
| 7,591,422 | B2 | 9/2009 | Maitin | |
| 7,703,308 | B2 * | 4/2010 | Nagelski | A47F 5/0861 70/57.1 |
| 8,307,995 | B2 | 11/2012 | Surma et al. | |
| 8,341,987 | B2 | 1/2013 | Nagelski | |
| 8,523,012 | B2 | 9/2013 | Richardson et al. | |
| 8,534,469 | B2 | 9/2013 | Northrup, Jr. et al. | |
| 8,629,772 | B2 | 1/2014 | Valiulis et al. | |
| 8,684,227 | B2 | 4/2014 | Richardson et al. | |
| 8,777,020 | B2 | 7/2014 | Winig et al. | |
| 8,842,011 | B2 | 9/2014 | Casey | |
| 9,013,306 | B2 | 4/2015 | Koh et al. | |
| 9,675,184 | B2 | 6/2017 | Xin | |
| 9,820,587 | B1 | 11/2017 | Cheng et al. | |
| 10,111,540 | B2 | 10/2018 | Brej | |
| 10,121,341 | B2 * | 11/2018 | Ewing | G08B 13/2434 |
| 10,219,636 | B2 | 3/2019 | Berglund et al. | |
| 10,334,964 | B2 | 7/2019 | Hachmann | |
| 10,339,495 | B2 | 7/2019 | Swafford et al. | |
| 10,420,427 | B2 | 9/2019 | Hachmann | |
| 10,426,278 | B2 | 10/2019 | Valiulis et al. | |
| 10,694,871 | B1 | 6/2020 | Vogler et al. | |
| 11,006,768 | B2 | 5/2021 | Berglund et al. | |
| 11,087,601 | B1 | 8/2021 | Ewing et al. | |
| 11,154,144 | B2 | 10/2021 | Bird et al. | |
| 11,363,894 | B2 | 6/2022 | Ewing et al. | |
| 11,403,906 | B2 | 8/2022 | Hua et al. | |
| 11,643,850 | B2 * | 5/2023 | Eden | A47F 5/0861 385/78 |
| 11,680,427 | B2 * | 6/2023 | Eden | G08B 13/149 211/7 |
| 2003/0029816 | A1 * | 2/2003 | Huehner | A47F 5/0861 211/8 |
| 2006/0261016 | A1 | 11/2006 | Magid | |
| 2008/0142538 | A1 | 6/2008 | Miller | |
| 2008/0209960 | A1 * | 9/2008 | Nagelski | A47F 5/0861 70/57.1 |
| 2010/0175438 | A1 | 7/2010 | Sankey | |
| 2011/0036789 | A1 * | 2/2011 | Richardson | A47F 5/0861 211/1.57 |
| 2012/0253508 | A1 | 10/2012 | Holmes | |
| 2014/0352372 | A1 | 12/2014 | Grant et al. | |
| 2015/0096998 | A1 | 4/2015 | Bird et al. | |
| 2016/0012692 | A1 | 1/2016 | Grant et al. | |
| 2018/0211501 | A1 * | 7/2018 | Ewing | G08B 13/149 |
| 2018/0296007 | A1 | 10/2018 | Berglund et al. | |
| 2019/0279149 | A1 | 9/2019 | Swafford et al. | |
| 2020/0323361 | A1 | 10/2020 | Vogler et al. | |
| 2021/0030169 | A1 | 2/2021 | Zhai et al. | |
| 2022/0178175 | A1 | 6/2022 | Eden et al. | |
| 2022/0334323 | A1 | 10/2022 | Eden et al. | |
| 2023/0212889 | A1 * | 7/2023 | Eden | G08B 13/149 385/78 |
| 2023/0250675 | A1 * | 8/2023 | Eden | E05B 73/00 70/58 |

FOREIGN PATENT DOCUMENTS

| | | | | | |
|---|---|---|---|---|---|
| WO | 2020/218919 | A1 | | 10/2020 | |
| WO | WO-2022125664 | A1 | * | 6/2022 | A47F 1/128 |

* cited by examiner

ANTI-THEFT MERCHANDISE HOOK

CROSS-REFERENCE TO RELATED PATENT APPLICATIONS

This patent application is a continuation of U.S. patent application Ser. No. 17/545,469, filed Dec. 8, 2021, which claims the benefit of U.S. Provisional Patent Application No. 63/123,299, filed Dec. 9, 2020, the entire teachings and disclosures of which are incorporated herein by reference thereto.

FIELD OF THE INVENTION

This invention generally relates to retail systems, and, more particularly, to theft detection systems for use in a retail environment.

BACKGROUND OF THE INVENTION

Loss prevention is a continuing problem in the retail industry. The retail industry is continually looking for better ways to prevent loss due to theft. Therefore, many retail environments incorporate various types of theft deterrence systems. Some current anti-theft systems involve locking up merchandise behind counters, often far away from related merchandise, or locking up the merchandise in secure cabinets, closer to the place where related merchandise is generally stored.

There are disadvantages to each of these methods. When merchandise is stored in a secured location away from the point of storage of related items, sales of the secured merchandise decrease because customers are less likely to go out of their way to locate a sales associate to retrieve the merchandise. When merchandise is stored in a secured cabinet near the point of storage of related items, sales of related items that would otherwise be situated in proximity to the secured merchandise decrease as well because the customer is not drawn to their location.

Therefore, although common anti-theft systems may be effective at preventing loss, they also have the significantly negative impact of reducing sales. Additionally, multiple secured storage devices may be costly to deploy in a retail setting, while taking up space that could be used other merchandise.

Accordingly, there exists a need in the art for an anti-theft system for retail stores that will deter theft without discouraging the sale of the merchandise and related items. Additionally, there is a need for anti-theft systems which can be retrofitted onto existing retail displays to keep the cost of installation and the shelving downtime required for installation as low as possible.

Embodiments of the present invention provide such an anti-theft system. This and other advantages of the invention, as well as additional inventive features, will be apparent from the description of the invention provided herein.

BRIEF SUMMARY OF THE INVENTION

In one aspect, embodiments of the invention provide an anti-theft merchandise hook having a top wire connected to a housing portion at a first end of the top wire, and connected to a mounting portion at a second end of the top wire opposite the first end. The mounting portion is used to mount the anti-theft merchandise hook to a stationary surface. The bottom wire is attached to the mounting portion, extending from the mounting portion toward the housing portion, and is configured to hold retail merchandise. A moveable hanger is at least partially disposed within the housing portion. The hanger is configured to move linearly between a closed position in which the hanger abuts the bottom wire, and an open position in which the hanger is spaced some distance from the bottom wire.

In particular embodiments, an end of the hanger that abuts the bottom wire is concave, and an end of the bottom wire that abuts the hanger is convex. In other embodiments, both the hanger and bottom wire include conductive material that form an electrical contact when the bottom wire that abuts the hanger, and the electronic circuitry of the anti-theft merchandise hook is configured to detect the electrical contact.

In some embodiments, the hanger includes a notch, and the hanger is configured to be manually moved into a locking position by a user, and locked into the closed position when a plunger, disposed within the housing portion is seated in the notch. In particular embodiments, the plunger is configured to move back and forth in a first direction perpendicular and the hanger is configured to move back and forth in a second direction perpendicular to the first direction. In a further embodiment, the plunger moves linearly back and forth, and the plunger's movement is effected by a motor disposed in the housing portion. The motor may be configured such that it is activated by an RFID-enabled device placed in proximity to the housing portion. In certain embodiments, the motor is an electrically-powered stepper motor.

The anti-theft merchandise hook may include electronic circuitry disposed in the housing portion, the electronic circuitry including an emitter configured to emit at least one of an audible, a visible, and a wireless radio alarm signal. Additionally, embodiments of the invention include a limit switch to track an amount of time that the hanger is in the open position, and to trigger the alarm signal if the hanger remains open for more than a threshold period of time.

In certain embodiments, the mounting portion includes a mounting face with means for locking the anti-theft merchandise hook into a mounted position. The mounting portion may further include a mounting face plunger that is depressed when the mounting portion is mounted flush to a stationary surface, and which triggers an alarm when released mounting face plunger that triggers an alarm when released.

In a further embodiment, the top and/or bottom wire is electrically coupled to the electronic circuitry such that the top and/or bottom wires function as an antenna for the transmission of the wireless radio alarm signal. The anti-theft merchandise hook may also include an alarm box, located remotely from the anti-theft merchandise hook, and configured to receive the wireless radio alarm signal from the emitter and to emit a second alarm, and/or relay the wireless radio alarm signal to another location.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
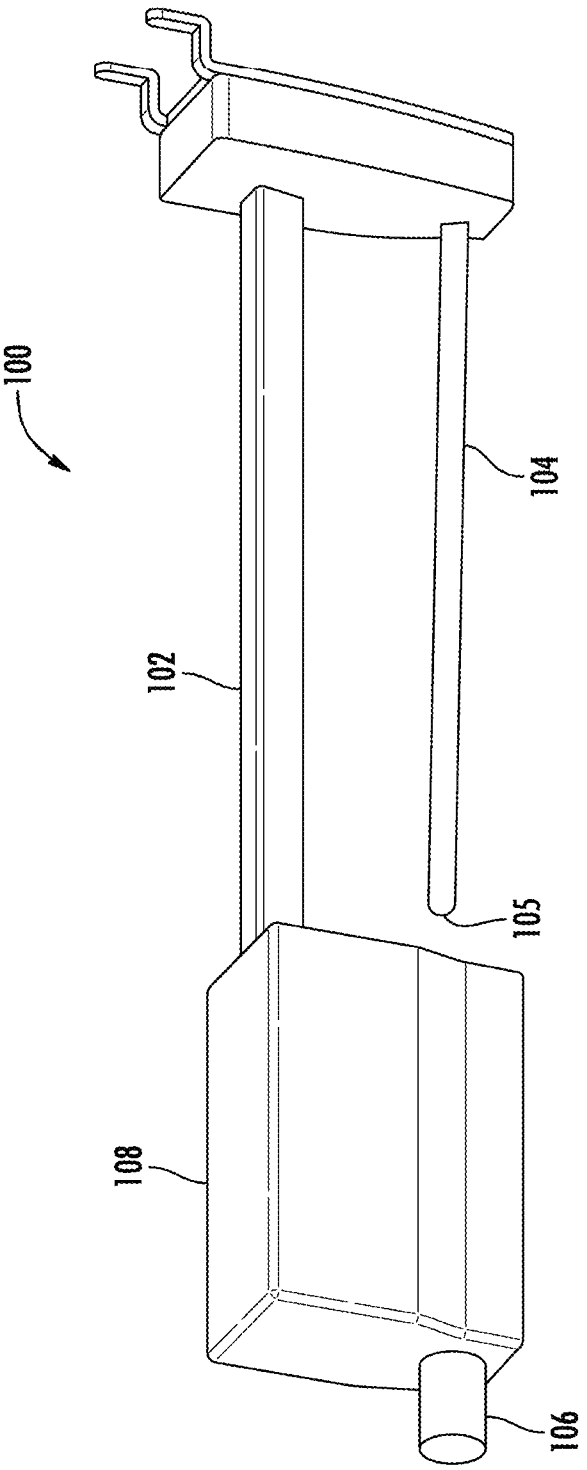
FIG. 1 is a front perspective view of an anti-theft merchandise hook in the open position constructed in accordance with an embodiment of the invention.
Figure 2:
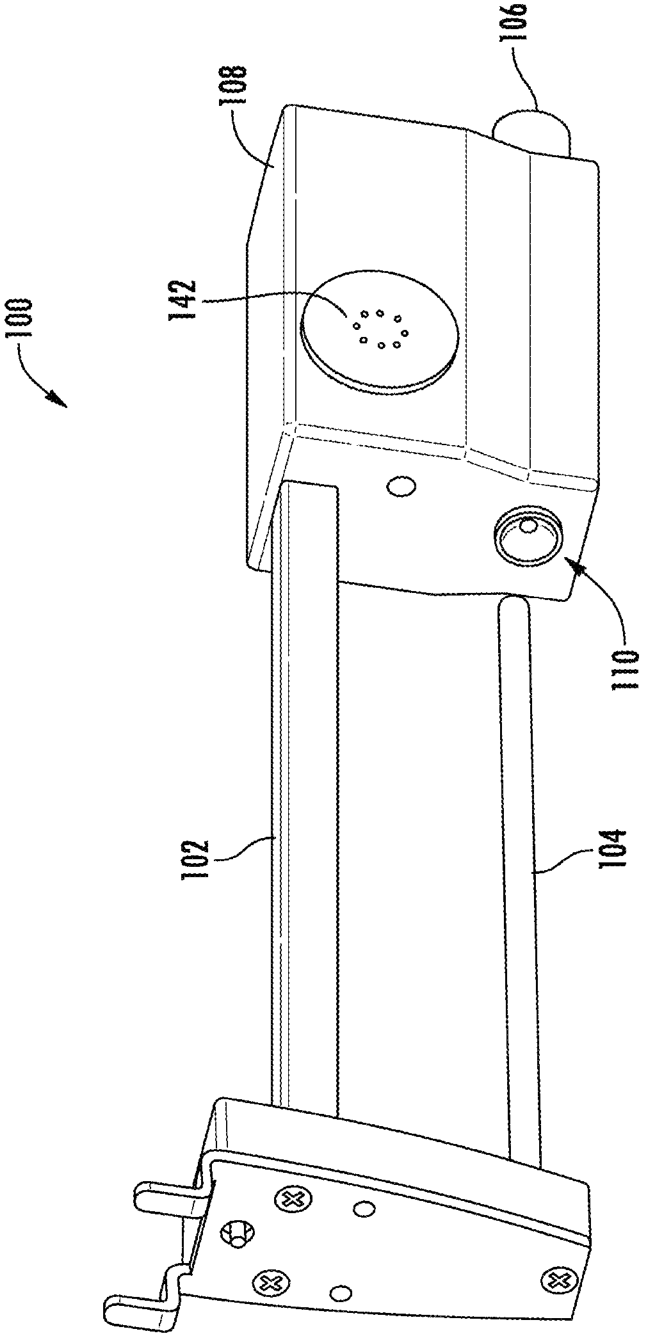
FIG. 2 is a rear perspective view of an anti-theft merchandise hook in the open position constructed in accordance with an embodiment of the invention.
Figure 3:
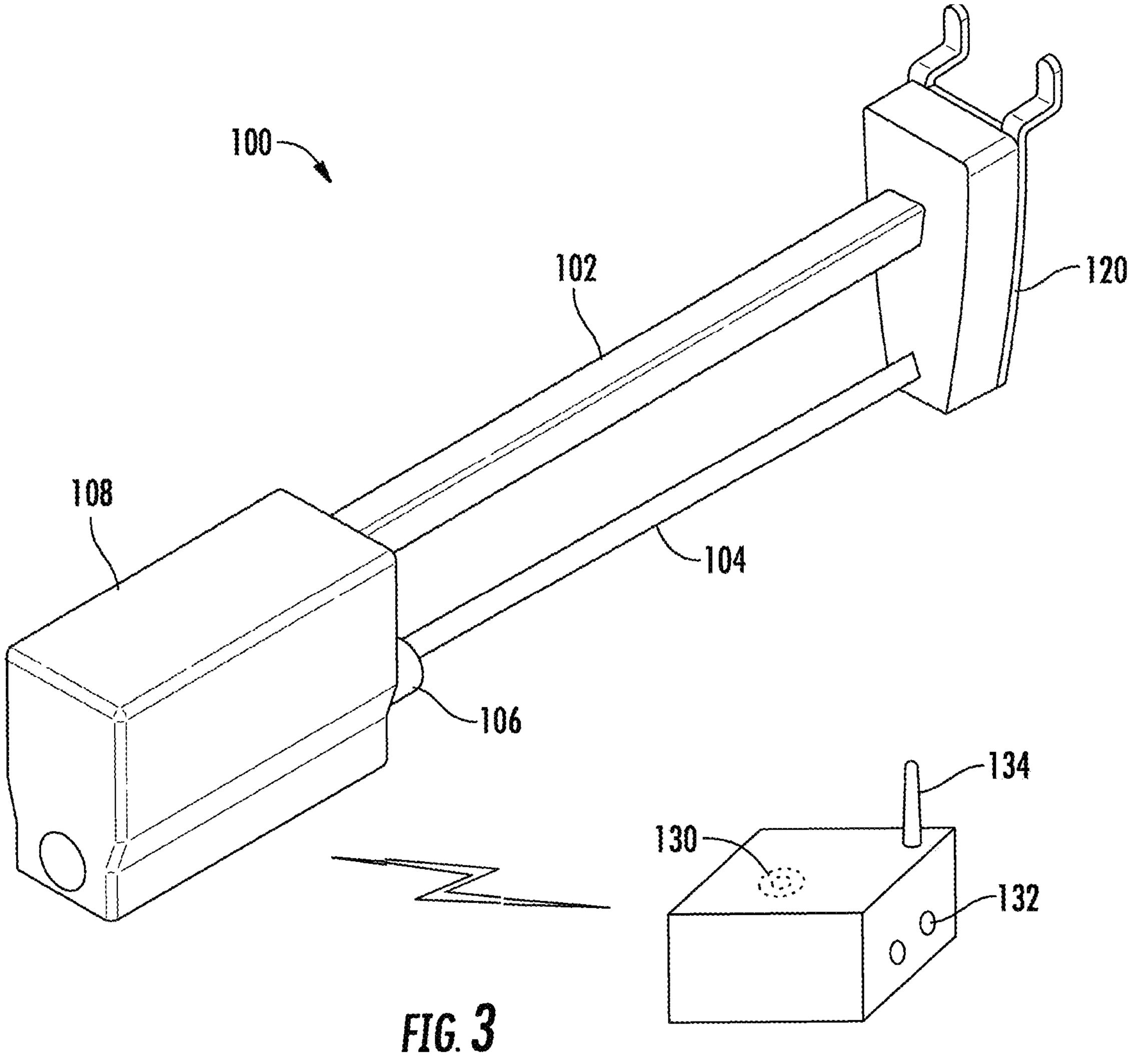
FIG. 3 is a front perspective view of an anti-theft merchandise hook in the closed position constructed in accordance with an embodiment of the invention.
Figure 4:
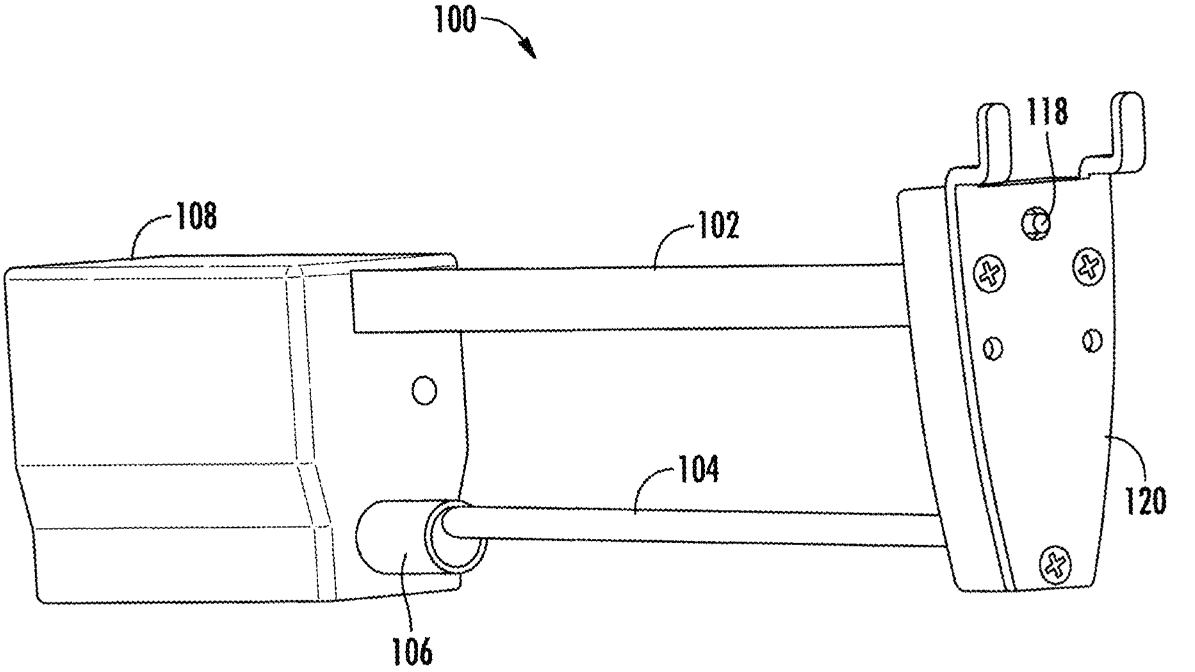
FIG. 4 is a rear perspective view of an anti-theft merchandise hook in the closed position constructed in accordance with an embodiment of the invention.

FIGS. 1 and 2 provide front and rear perspective views of anti-theft merchandise hook 100 in the open position, the anti-theft merchandise hook 100 constructed in accordance with an embodiment of the invention. FIGS. 3 and 4 provide front and rear perspective views of anti-theft merchandise hook 100 in the closed position in accordance with an embodiment of the invention. In certain embodiments, the anti-theft merchandise hook 100 is an RFID-activated merchandise hook with a top wire 102 and a bottom wire 104 on which the merchandise is held, where the bottom wire 104 is shorter in length than the top wire 102.

The anti-theft merchandise hook 100 further includes a spring-biased hanger 106 that is moved laterally back and forth between a closed position in which the hanger 106 is securely abutted to an end of the bottom wire 104, and an open position in which the hanger 106 is separated from the end of the bottom wire 104. In the open position, the space between the hanger 106 and bottom wire 104 allows for merchandise to be removed from the hook 100. In the closed position, no merchandise can be removed. In the embodiments shown, the hanger 106 is substantially cylindrical, though in alternate embodiments, the hanger 106 could be prismatic, curved, spiraled, or some other suitable shape.

Figure 5A:
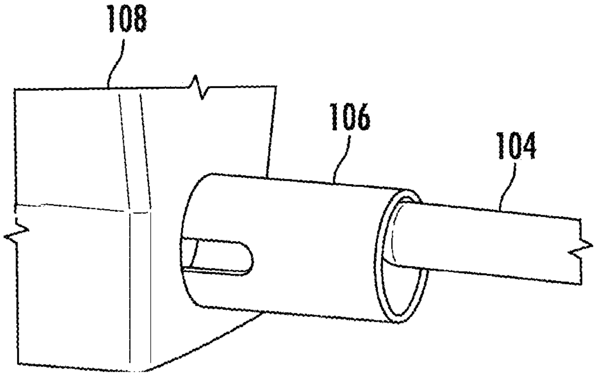
FIGS. 5A and 5B are close up perspective views of the hanger and bottom wire according to an embodiment of the invention.
Figure 5B:
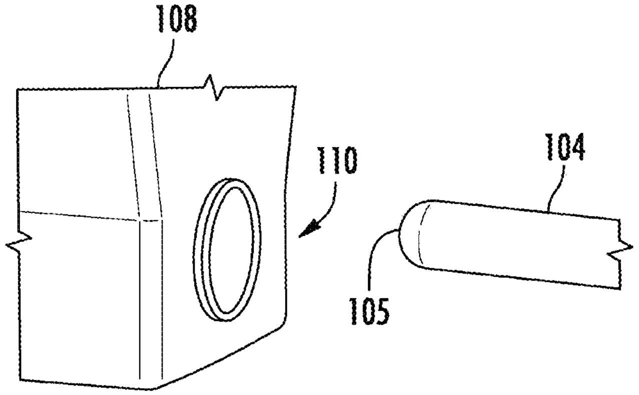

In a particular embodiment of the invention which includes that shown in FIGS. 1-4, the hanger 106 is disposed, at least partially, within a housing 108 of the anti-theft merchandise hook 100. As shown in the embodiments of FIGS. 4, 5A, and 5B, the hanger 106 may have a concave or cup-shaped end 110 configured to abut securely against an end 105 of the bottom wire 104 when the anti-theft merchandise hook 100 is in the closed position. The end 105 of the bottom wire 104 may be convex or rounded to facilitate a fit between the concave cup-shaped end 110 and the end 105 of the bottom wire 104. Thus, the convex end of the bottom wire 104, when abutted with the correspondingly concave end of the hanger 106 provides a secure attachment between the two components such that no merchandise can be removed from the bottom wire 104.

In more particular embodiments, electronic circuitry 140 disposed within the housing 108 is able to detect when the hanger 106 is in contact with the bottom wire 104, and therefore able to determine when the anti-theft merchandise hook 100 is in the closed position. In some embodiments, the electronic circuitry 140 of the anti-theft merchandise hook 100 is battery-powered. Alternate embodiments are envisioned in which the electronic circuitry 140 is powered by means other than a battery, e.g., solar cell, hardwired to building power, etc.

The bottom wire 104 may be made from metal or some similarly conductive material, while some portion of the hanger 106, including a portion that abuts the bottom wire 104, is also made from metal or some similarly conductive material, such that an electrical circuit is formed when the bottom wire 104 and hanger 106 are in contact with each other. The electronic circuitry 140 of the anti-theft merchandise hook 100 may be able to detect when the bottom wire 104 and hanger 106 are in contact with each other based on the formation of this electrical circuit.

Figure 6B:
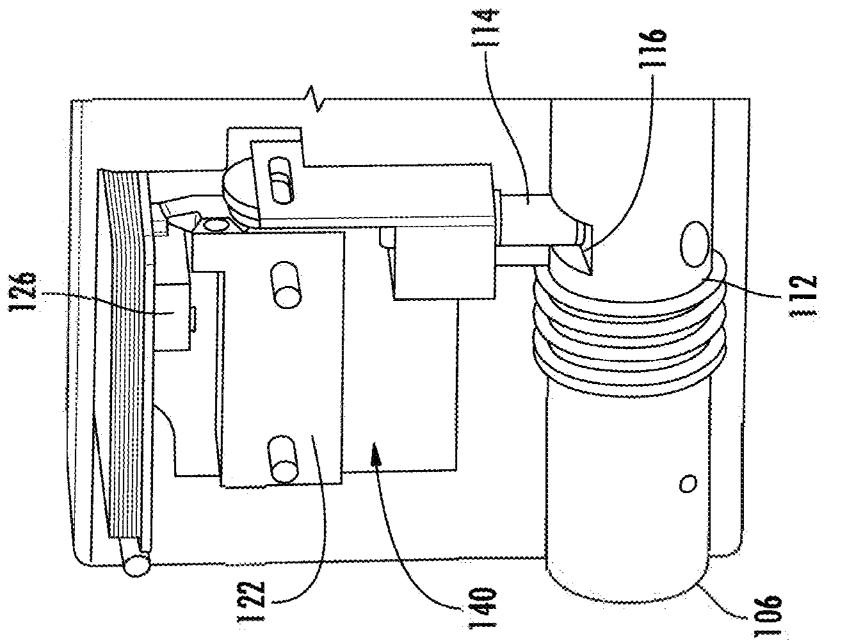
FIGS. 6A and 6B show, respectively, a perspective view of the hanger disposed in a housing of the anti-theft merchandise hook, and a perspective view of a part of the hanger, motor, and plunger inside the housing, in accordance with an embodiment of the invention.
Figure 6A:
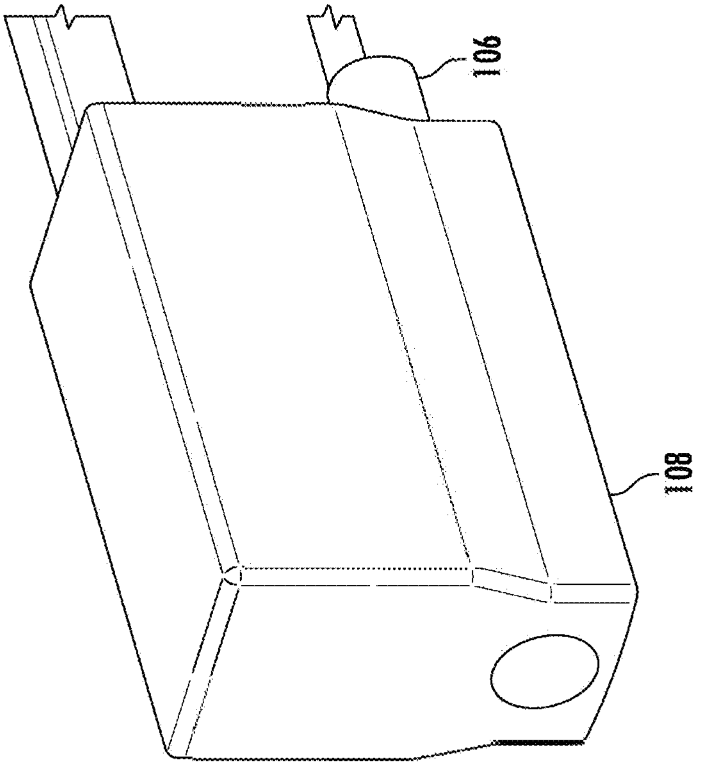

In the embodiment of FIGS. 6A and 6B, a spring 112 is assembled onto the hanger 106 within the housing 108. The spring 112 abuts a surface within the housing 108 such that the spring 112 biases the hanger 106 in the open position. A second end of the hanger 106 opposite the cup-shaped end 110 protrudes from the housing 108. The user pushes on this second end of the hanger 106, against the force of spring 112 in order to bring the hanger 106 in contact with the bottom wire 104, thereby closing the anti-theft merchandise hook 100.

The hanger 106 may then be locked in the closed position by a plunger 114 within the housing 108. In the embodiment shown in FIG. 6B, the plunger 114 is substantially cylindrical and arranged perpendicularly to the hanger 106 (in this case vertically with respect to the horizontally-arranged hanger 106), and is seated within a notch 116 cut into a middle portion of the hanger 106 to lock the hanger 106 in place and keep it from moving back to the open position. In alternate embodiments, the plunger 114 could be assume different shapes, e.g., prismatic, that engage the notch 116 to lock the hanger 106 in the closed position.

In the embodiment shown, the plunger 114 is moved back and forth by a small motor 122 disposed within the housing 108. The motor 122 may be an electrically-powered stepper motor. The electronic circuitry 140 in the housing 108 operates the motor 122 in response to an RFID-enabled device, e.g., an RFID card or RFID key (not shown), or other suitable device when placed in proximity to the housing 108. For example, it is contemplated that devices other than RFID-enabled devices (e.g., magnetic, electromagnetic, etc.) may be used to operate the motor 122 and plunger 114. In one particular example, tapping the RFID card on the housing 108 may cause the plunger 114 to seat in the notch 116 of the hanger 106 when the user pushes the hanger 106 into contact with the bottom wire 104. Subsequently, tapping the RFID card on the housing 108 may then cause the plunger 114 to unseat from the notch 116 to open the anti-theft merchandise hook 100.

In a particular embodiment of the invention, a limit switch 126 is disposed in the housing 108 and configured to track the time the anti-theft merchandise hook 100 is in the open position and to issue an alarm if the anti-theft merchandise hook 100 remains in the open position longer than a threshold period of time. For example, the limit switch 126 may be configured such that the anti-theft merchandise hook 100 emits an audible alarm and/or a wireless alarm signal if the anti-theft merchandise hook 100 is in the open position for more than 15 seconds, or even 30 seconds. However, threshold times greater than 30 seconds and lesser than 15 seconds are envisioned. In certain embodiments of the invention, the user may adjust the threshold time limit before the limit switch 126 causes the alarm to issue.

In a further embodiment, the aforementioned RFID-enabled device, when used to tap the housing 108 or placed in close proximity to the housing 108, activates the motor 122 which lifts the plunger 114 out of the notch 116 so that the spring 112 moves the hanger 106 away from the bottom wire 104, thus allowing for the removal of merchandise from the bottom wire 104. The lifting of the plunger 114 depresses and activates the limit switch 126 which starts a timer. After the threshold period of time, if the hanger 106 remains separated from the bottom wire 104, the limit switch 126 may cause anti-theft merchandise hook 100 to issue an alarm. The alarm may issue for a specified period of time, or the alarm may continue until the hanger 106 is urged into contact with the bottom wire 105 and the plunger 114 lowered into the notch 116 to lock the hanger 106 in place.

The electronic circuitry 140 in the housing 108 may include an emitter 142 capable of emitting an audible, visible, and wireless radio alarm signal. Additionally, the top 102 and/or bottom wire 104 may be electrically coupled to the electronic circuitry 140 such that the wire(s) functions as an antenna for the transmission of the signal to the wireless radio alarm signal. In certain embodiments, the wireless radio alarm signal emitted by the electronic circuitry 140 of the anti-theft merchandise hook 100 is configured to be transmitted to an alarm box 128 (see FIG. 3).

In particular embodiments, the alarm box 128 includes a receiver configured to receive a wireless signal from one or more signal-emitting retail display devices. In some embodiments, the alarm box 128 also has an alarm box emitter 130 configured to emit an audible signal indicative of the wireless signal received from the one or more signal-emitting retail display devices, and one or more terminals 132 for connecting the alarm box 128 to an output receiving device. In certain embodiments, the alarm box emitter 130 is also configured to emit a visible signal indicative of the wireless signal received from the one or more signal-emitting retail display devices. In such a case, the alarm box 128 may include one or more LEDs or other light-emitting devices capable of indicating multiple types of alarm conditions or indicating a particular status of one or more anti-theft merchandise hooks 100. Furthermore, the alarm box 128 may also include an antenna 134 for transmitting wireless signals indicative of an alarm condition. The wireless signals may be transmitted to an output receiving device capable of receiving wireless transmission or to some remotely-located receiving station.

Figure 7:
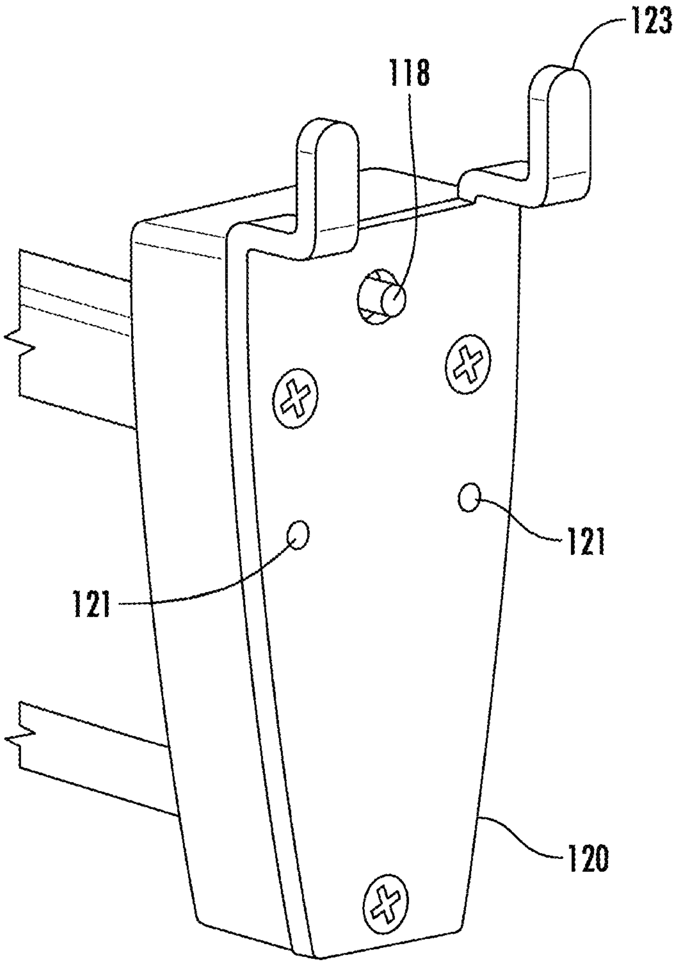
FIG. 7 is a perspective view of the mounting apparatus for the anti-theft merchandise hook according to an embodiment of the invention.

FIG. 7 shows a perspective view of the mounting apparatus 120 for the anti-theft merchandise hook 100 according to an embodiment of the invention. The mounting apparatus 120 of the anti-theft merchandise hook 100 is for mounting or attaching the mounting apparatus 120 to a fixed or stationary surface to fix the position of the anti-theft merchandise hook 100. In the embodiments shown, the mounting apparatus 120 includes one or more openings 121 in which is arranged a mechanical mounting lock 124.

In the embodiments shown, the mounting apparatus 120 includes two mounting projections 123 for securing the anti-theft merchandise hook 100 to a pegboard. In a particular embodiment, the mounting apparatus 120 includes a mounting face plunger 118 that is depressed when the mounting apparatus 120 is secured flush to a stationary surface, such that when the anti-theft merchandise hook 100 is removed from its flush mounting to the stationary surface, the mounting face plunger 118 is released thus triggering an alarm.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anti-theft merchandise hook comprising:

a top wire connected to a housing portion at a first end of the top wire, and to a mounting portion, used to mount the anti-theft merchandise hook to a stationary surface, at a second end of the top wire opposite the first end;

a bottom wire attached to the mounting portion and extending from the mounting portion toward the housing portion, the bottom wire configured to hold retail merchandise;

a moveable hanger at least partially disposed within the housing portion, the hanger configured to move linearly between a closed position in which the hanger abuts the bottom wire, and an open position in which the hanger is spaced some distance from the bottom wire wherein a plunger is configured to move between a locked position, in which the plunger is seated in a notch in the hanger, and an unlocked position in which the plunger is separated from the hanger; and wherein the plunger is configured to move back and forth in a first direction, and the hanger is configured to move back and forth in a second direction perpendicular to the first direction.

2. The anti-theft merchandise hook of claim 1, wherein the hanger includes a notch and the hanger is configured to be manually moved into a locking position by a user, and locked into the closed position when the plunger, disposed within the housing portion is seated in the notch.

3. The anti-theft merchandise hook of claim 1, further comprising electronic circuitry disposed in the housing portion, the electronic circuitry configured to operate an emitter which is configured to emit at least one of an audible alarm or a visible alarm.

4. The anti-theft merchandise hook of claim 3, wherein the top and/or bottom wire is electrically coupled to the electronic circuitry such that the top and/or bottom wires function as an antenna for the transmission of a wireless radio alarm signal.

5. The anti-theft merchandise hook of claim 3, wherein the electronic circuitry configured to transmit a wireless radio signal indicative of an alarm condition.

6. The anti-theft merchandise hook of claim 1, further comprising a limit switch configured to track an amount of time that the hanger is in the open position, and to trigger the alarm signal if the hanger remains open for more than a threshold period of time.

7. The anti-theft merchandise hook of claim 1, wherein the mounting portion includes a mounting face with means for locking the anti-theft merchandise hook into a mounted position.

8. The anti-theft merchandise hook of claim 7, wherein the mounting portion further includes a mounting face plunger that is depressed when the mounting portion is mounted flush to a stationary surface, and which triggers an alarm when the mounting face plunger is released.

9. The anti-theft merchandise hook of claim 1, wherein an end of the hanger that abuts the bottom wire is concave, and an end of the bottom wire that abuts the hanger is convex.

10. The anti-theft merchandise hook of claim 9, wherein both the hanger and bottom wire include conductive material that form an electrical contact when the bottom wire that abuts the hanger, and wherein the anti-theft merchandise hook is configured to detect the electrical contact.

* * * * *